United States Patent [19]

Dawson et al.

[11] Patent Number: 5,624,886
[45] Date of Patent: Apr. 29, 1997

[54] CONTROLLED DEGRADATION OF POLYSACCHARIDES

[75] Inventors: Jeffrey C. Dawson, Spring; Hoang Van Le, Houston; William R. Wood, Spring, all of Tex.

[73] Assignee: BJ Services Company, Houston, Tex.

[21] Appl. No.: 922,129

[22] Filed: Jul. 29, 1992

[51] Int. Cl.$^6$ ..................................................... E21B 43/27
[52] U.S. Cl. ..................... 507/217; 507/921; 507/241; 507/237; 507/238; 507/273; 507/269
[58] Field of Search .................................. 507/217, 237, 507/238, 241, 921

[56] References Cited

U.S. PATENT DOCUMENTS 4,202,795  5/1980  Burnham et al. .
4,506,734  3/1985  Nolte .
4,604,218  8/1986  Dawson .
4,741,401  5/1988  Walles et al. .

*Primary Examiner*—Gary Geist
*Attorney, Agent, or Firm*—Charles D. Gunter, Jr.

[57] ABSTRACT

A method is shown for fracturing a subterranean formation in which a hydratable polymer, crosslinking agent and breaker are combined in an aqueous carrier to form a gelled fracturing fluid. The breaker is comprised of a substantially insoluble oxidant which is granulated and formed into a pellet or prill with a suitable binder. The pellet so formed can also contain a chelating agent and an activator in order to enhance the rate of breaking. The substantially insoluble oxidant is selected from the group consisting of alkaline earth and zinc salts of peroxide, perphosphate, perborate, and percarbonate.

18 Claims, No Drawings

5,624,886

1

CONTROLLED DEGRADATION OF POLYSACCHARIDES

BACKGROUND OF THE INVENTION

1. Field of the Invention

The present invention relates to fracturing fluids of the type used to fracture subterranean formations and, more particularly, to a method for breaking a fracturing fluid through the use of a chemical agent incorporated within the viscosified fluid.

2. Description of the Prior Art

During the drilling of a well and the subsequent recovery of fluids from the well such as crude oil and natural gas, various materials are used to improve the efficiency of the well drilling operation, to increase the production of fluids from the formation and/or to plug or seal a non-producing well. For example, a subterranean formation is often subjected to a fracturing treatment to enhance the recovery of fluids such as crude oil or natural gas. During hydraulic fracturing, a sand laden fluid is injected into a well bore under pressure. Once the natural reservoir pressures are exceeded, the fracturing fluid initiates a fracture in the formation which generally continues to grow during pumping. The treatment design generally requires the fluid to reach maximum viscosity as it enters the fracture which affects the fracture length and width. This viscosity is normally obtained by the gellation of suitable polymers, such as a suitable polysaccharide. The gelled fluid can be accompanied by a propping agent which results in placement of the propping agent within the fracture thus produced. The proppant remains in the produced fracture to prevent the complete closure of the fracture and to form a conductive channel extending from the well bore into the formation being treated once the fracturing fluid is recovered.

The recovery of the fracturing fluid is accomplished by reducing the viscosity of the fluid to a low value such that it flows naturally from the formation under the influence of formation fluids. This viscosity reduction or conversion is referred to as "breaking" and can be accomplished by incorporating chemical agents, referred to as breakers, into the initial gel.

In addition to the importance of providing a breaking mechanism for the gelled fluid to facilitate recovery of the fluid and resume production, the timing of the break is also of great importance. Gels which break prematurely can cause suspended proppant material to settle out of the gel before being introduced a sufficient distance into the produced fracture. Premature breaking can also result in a premature reduction in the fluid viscosity resulting in a less than desirable fracture width in the fracture being created.

On the other hand, gelled fluids which break too slowly can cause slow recovery of the fracturing fluid from the produced fracture with attendant delay in resuming the production of formation fluids. Additional problems can result, such as the tendency of proppant to become dislodged from the fracture, resulting in at least partial closing and decreased efficiency of the fracturing operation.

For purposes of the present application, premature breaking will be understood to mean that the gel viscosity becomes diminished to an undesirable extent before all of the fluid is introduced into the formation to be fractured. Thus, to be satisfactory, gel viscosity should remain in the range from about 50 to 75% of the initial viscosity at temperature over the entire time, usually between one and eight hours, that is required to pump the fluid into the fracture.

2

Optimally, the fracturing gel will begin to break when the pumping operations are concluded. For practical purposes, the gel should be completely broken within about 24 hours after completion of the fracturing treatment. A completely broken gel will be taken to mean one that can be flushed from the formation by the flowing formation fluids or that can be recovered by a swapping operation. In the laboratory setting, a completely broken, non-cross linked gel is one whose viscosity is about 10 centipoise or less as measured on a Model 35 FANN viscometer at 300 rpm or less than 100 centipoises by Brookfield viscometer.

The controlled degradation of water soluble polysaccharides, used as viscosifying agents in hydraulic fracturing treatments of oil and gas wells, is thus an important consideration. Historically, persulfate salts were added to the fracturing fluid to cause viscosity loss due to polymer degradation. Laboratory evaluations are routinely made before the treatment to find the persulfate concentration necessary to cause a reasonable viscosity decline. However, fracture conductivity studies have recently shown that the recommended persulfate concentrations are routinely inadequate to remove the residual fluid's impairment of the proppant pack.

The discrepancy in persulfate concentration is due, in part, to the filtration processes that occur during fracturing. During fluid and proppant injection, the solublized persulfate easily filters through the polymer filter cake formed at the fracture face. This persulfate laden filtrate is ultimately discharged into the formation reservoir where the oxidant harmlessly degrades. Consequently, the ratio of polymer to persulfate within the fracture is steadily increasing during injection.

One proposed method for controlling the activity of the breaker is described in U.S. Pat. No. 4,202,795 to Burnham et al. in which the breaker is introduced into the subterranean formation in the form of a prill or pellet formed by combining gel degrading substances with a hydratable gelling agent and forming the resulting mixture into the desired prill or pellet form. Upon exposure of the prills or pellets to an aqueous fluid, the gelling agent is said to hydrate and form a protective gel around each of the pellets, thereby preventing the release of the breaker into the aqueous fluid until the protective gel is broken by the gel-degrading substance. The cited reference claims that the breaker can be released to the aqueous fluid in a controlled manner by the described mechanism. It appears that a relatively large amount of the hydratable gelling agent is required to prepare the pellets and that the amount of hydratable gelling agent must be carefully controlled. In addition, the time period over which the pellets are released may vary substantially.

U.S. Pat. No. 4,506,734 to Nolte describes another method for delaying the release of a breaker by introducing a viscosity reducing chemical contained within hollow or porous, crushable beads into a hydraulic fracturing fluid. The viscosity reducing agent is said to be released upon the crushing of the beads which results from the closing of the fractures, caused by the fracturing fluid passing or leaking off into the formation or by removing the fluid by backflowing. However, stresses caused by the closing of the formation affect the percentage of beads being crushed so that a large percentage of beads may remain unbroken, particularly if the formation closes at a slow rate. Also, a large percentage of the beads may be crushed in one area of the formation being treated, whereas a secondary area of the formation may contain a substantially lower amount of beads to be crushed with resulting inconsistent performance.

A recent improvement to the above processes is described in U.S. Pat. No. 4,741,401 to Walles et al. in which an oxidant granule is encapsulated within a polymeric coating. The coating initially isolates the persulfate oxidant from the gelled fluid to minimize immediate viscosity declines while also allowing the granule to plate out in the filter cake. This places the oxidant in the filter cake to eventually degrade the polysaccharide both in the fluid and the filter cake. The persulfate is reportedly released by both permeation through the coating and by the crushing of the pellet by the proppant during fracture closure.

Although encapsulation offers certain advantages over the previously described prior art techniques, it also suffers from several disadvantages. For example, the coating thickness can be nonuniform, allowing a portion of the oxidant to be released immediately to cause initial fluid thinning. Secondly, at the high pressures encountered during fracturing, water permeates through the coating into the capsule interior. Heating from the reservoir and high concentrations of dissolved persulfate in the interior of the capsules cause nonproductive side reactions that continually consume oxidant. This loss of oxidant significantly affects the product's efficiency.

The present invention has as its object to provide a break mechanism for a gelled fracturing fluid which yields high initial viscosity with little change during pumping but which produces a rapid break in the gel after pumping is completed to allow immediate recovery of the fluid from the formation.

Another object of the invention is to provide a gel system for a well fracturing operation which will completely break within about 24 hours but which will maintain a satisfactory viscosity at operating temperatures for a time sufficient to complete the fracturing treatment.

Although the previously described methods describe delayed release of a breaker into a subterranean formation, the present invention has as its object to provide an alternative and improved method which provides a reliable, efficient and commercially viable breaking mechanism which is superior in performance to the previously described methods.

SUMMARY OF THE INVENTION

In the method of the invention, a gellable fracturing fluid is formulated by blending together an aqueous fluid, a hydratable polymer, a suitable crosslinking agent for crosslinking the hydratable polymer to form a polymer gel and a breaker in the form of a pellet material. The pellet material comprises a substantially insoluble oxidant and a binder for the oxidant. The pellet material is present within the fracturing fluid in an amount effective to degrade the polymer gel at formation temperatures within about 24 hours. The substantially insoluble oxidant is selected from the group consisting of alkaline earth and zinc salts of peroxide, perphosphate, perborate and percarbonate. The oxidant used to form the pellet is preferably provided in a preselected granule size, the granule size being in the range from about 200 to 6 U.S. mesh. Most preferably, the granule size of the oxidant is in the range of about 80 to 12 U.S. mesh.

The pellet of substantially insoluble oxidant can also contain a chelating agent and an activator. The chelating agent is preferably selected from the group consisting of salts of ethylenediaminetetraacetic acid, citric acid, aminocarboxylic acid and its salts, polyphosphonated and polyphosphated compounds, boric acids and its salts and the alkali metal salts of carbonates. The activator is preferably selected from the group consisting of iron and copper complexes of ethylenediaminetetraacetic acid. The binder for the substantially insoluble oxidant is most preferably sodium silicate.

A particularly preferred pellet material is comprised of from about 40 to 99% oxidant, 1 to 20% binder, 0 to 75% chelating agent and 0 to 50% activator, all percentages being weight percentages based on the total weight of the pellet material so formed.

Additional objects, features and advantages will be apparent in the written description which follows.

DETAILED DESCRIPTION OF THE INVENTION

In order to practice the method of the invention, an aqueous fracturing fluid is first prepared by blending a hydratable polymer into an aqueous fluid. The aqueous fluid can be, e.g., water, brine or water alcohol mixtures. Any suitable mixing apparatus may be used for this procedure. In the case of batch mixing, the hydratable polymer and aqueous fluid are blended for a period of time which is sufficient to form a hydrated sol. The hydratable polymer useful in the present invention can be any of the hydratable polysaccharides familiar to those in the well service industry which is capable of gelling in the presence of a crosslinking agent to form a gelled base fluid. For instance, suitable hydratable polysaccharides are the galactomannan gums, glucomannan gums, guars, derived guars and cellulose derivatives. Specific examples are guar gum, guar gum derivatives, locust bean gum, caraya gum, carboxymethyl cellulose, carboxymethyl hydroxyethyl cellulose, and hydroxyethyl cellulose. The preferred gelling agents are guar gum, hydroxypropyl guar, carboxymethylhydroxypropyl guar , and carboxymethylhydroxyethyl cellulose. A suitable synthetic polymer is polyvinyl alcohol. The most preferred hydratable polymers for the present invention are guar gum and hydroxypropyl guar.

The hydratable polymer is added to the aqueous fluid in concentrations ranging from about 0.10% to 5.0% by weight of the aqueous fluid. A preferred range for the present invention is between about 0.20% to 0.80% by weight.

In addition to the hydratable polymer, the fracturing fluids of the invention include a crosslinking agent suitable for crosslinking the hydratable polymer to form a polymer gel. The crosslinking agent can be any of the conventionally used crosslinking agents which are known to those skilled in the art. For instance, in recent years, gellation of the hydratable polymer has been achieved by crosslinking these polymers with metal ions including aluminum, antimony, zirconium and titanium containing compounds including the so-called organotitanates. See for example, U.S. Pat. No. 4,514,309, issued Apr. 30, 1985, and assigned to the assignee of the present invention. Recently, there has been renewed interest in guar gels which are crosslinked by the addition of borate ion donating materials. Recent research indicates that these gels clean up faster and yield higher sand pack permeability than guar gels crosslinked with the other crosslinking agents. As a result, the borate crosslinking agents are currently popular.

In the case of borate crosslinkers, the crosslinking agent is any material which supplies borate ions. Thus, the crosslinking agent can be any convenient source of borate ions, for instance the alkali metal and the alkaline earth metal borates and boric acid. A preferred crosslinking additive is sodium borate decahydrate. This crosslinking additive is preferably present in the range from about 0.001% to in excess of 0.5% by weight of the aqueous fluid. Preferably, the concentration of crosslinking agent is in the range from about 0.005% to about 0.25% by weight of the aqueous fluid.

Propping agents are typically added to the base fluid prior to the addition of the crosslinking agent. Propping agents include, for instance, quartz sand grains, glass and ceramic beads, walnut shell fragments, aluminum pellets, nylon pellets, and the like. Other applicable proppants include those previously mentioned that are also coated with both cured and partially cured Novalak or Resole resins. The propping agents are normally used in concentrations between about 1 to 8 pounds per gallon of fracturing fluid composition but higher or lower concentrations can be used as required. The base fluid can also contain other conventional additives common to the well service industry such as surfactants, corrosion inhibitors, and the like.

The fracturing fluids of the invention also have incorporated therein a novel breaker which utilizes a substantially insoluble oxidant instead of a coated soluble oxidant, e.g., a persulfate. The breaker of the invention is incorporated into the gellable fracturing fluid in the form of a pellet or prill material. The pellet material comprises the substantially insoluble oxidant and a binder for the oxidant. The pellet material is present within the fracturing fluid in an amount effective to degrade the polymer at formation temperatures within a time period less than about 24 hours.

The substantially insoluble oxidant is preferably selected from the group consisting of alkaline earth and zinc salts of peroxide, perphosphate, perborate and percarbonate. The rate of solubility is dependant upon several parameters such as the solubility product constant, the temperature of the surrounding formation, pH of the fluid, shear forces acting on the fluid and the surface area of the granules. Generally, suitable oxidants for purposes of the present invention will have a solubility of less than 1% by weight, such as 1 gram material/100 grams water.

Representative examples of the substantially insoluble oxidants of the invention include:

|  | Solubility in grams per 100 cc | | |
| --- | --- | --- | --- |
|  | Cold Water | Hot Water | Other Solvents |
| calcium peroxide $CaO_2$ | sl s | — | s a |
| calcium perphosphate $Ca_2P_2O_8$ | i | i | i a |
| calcium perborate $Ca(BO_3)_2$ | sl s | — | s a, $NH_4$ salts, sls ac a |
| magnesium peroxide $MgO_2$ | i | i | s a |
| magnesium perphosphate $Mg_2P_2O_8$ | i | i | s, $NH_4$ salts, i liq $NH_3$ |
| zinc perphosphate $Zn_2P_2O_8$ | i | i | s a, $NH_4OH$; i al | where  i = insoluble
sl s = slightly soluble
s a = soluble in acid
i a = insoluble in acid
sl s ac a = slightly soluble in acids and alcohol In terms of the above table, "substantially insoluble" will be taken to mean a compound of the above type having a solubility in cold and hot water of "i" or "sl s" as listed in the Handbook of Chemistry and Physics, 72nd Edition, CRC Press.

Although not all of the above variables can be control led, e.g., temperature of the surrounding formation, fracturing fluid degradation is minimized for purposes of the present invention during injection of the fluid into the formation by purposefully controlling the oxidant's surface area. This is achieved by granulating the oxidant during the manufacturing process to sizes ranging from about 200 to 6 U.S. mesh, i.e., 0.0069 inches to 0.065 inches in diameter. The preferred granule size is in the range from about 80 to 12 U.S. mesh. The rate of fluid degradation will later increase during fracture healing as the proppant pack crushes the granules to fines, thus increasing the surface area of the oxidant.

The rate of polymer oxidation also can be further controlled by the addition of chelating agents to the pellet matrix. Incorporating substances such as salts of ethylenediaminetetraacetic acid (EDTA), citric acid, aminotricarboxylic acid and its salts, polyphosphonated and polyphosphated compounds, boric acid and its salts, and alkali metal salts of carbonates are all effective rate enhancing substances. Examples of polyphosphonates include: ethylenediaminetetra(methylenephosphonic acid); 1-hydroxyethylidene-1, 1-diphosphonic acid and aminotri (methylene phosphonic acid) and their salts. Examples of polyphosphates include adducts made from the reaction of polyhedric solvents such as glycerin and ethylene glycol with $P_2O_5$ to form the polyphosphated mixtures. The concentrations can range from 1 to 75% of the granule's weight.

The pellets of the invention can also contain activators such as ionic iron and copper species, which are effective at increasing the rate of oxidation. Any iron or copper complexes that are soluble in aqueous solutions will promote an oxidative rate enhancement. Compounds such as iron(III) EDTA or copper(II)EDTA were effective rate enhancers at concentrations ranging from 1 to 50% by weight based on the weight of the pellet.

The pellets can be processed by any method used to granulate particles including compaction or agglomeration. A typical compaction process forces a solvated slurry through a heated die. Afterward, the extrudant is continuously severed at the die's discharge port. The frequency of cutting and die's port diameter can be adjusted to control the particle size. The particles are then tumbled, dried and sieved.

The agglomeration process can be conducted in a fluidized bed. Regulating the air flow through the bed while top spraying the powder with a binder solution is frequently used to granulate the mixtures. The binder's spray rate through the nozzle and the air flow through the bed are frequently adjusted to produce particles of desirable size. The binder solution, usually an aqueous water soluble polymer solution, is chosen that will maximize the particle's integrity.

The preferred binder for the granules described in this application is an aqueous solution of sodium silicate. For example, after mixing with the alkaline earth salts of the oxidant, cation exchange occurs yielding the sodium salt of the oxidant and the alkaline earth salt of the silicate. This silicate salt is extremely gelatinous and after drying, provides good integrity for the granules. The concentration of sodium silicate in the aqueous solution is preferably from about 5 to 40% by weight based on the weight of aqueous solution in order to place between 1 and 40% by weight solid sodium silicate in the finished pellets. The binder solution preferably ranges from with about 1 to 40% by weight based on the weight of the granules. After formation of the granules, the water present in the aqueous solution is lost during drying.

The most preferred pellet formulation for purposes of the present invention is a combination of the insoluble oxidant, chelating agent and soluble metal ions contained within a pellet matrix. Typically, mixtures having 40 to 100% oxidant, 0 to 75% chelating agent, 0 to 50% metallic activators and 1 to 20% sodium silicate were effective. A particularly preferred composition includes 6% sodium silicate, 20% iron(III)EDTA, 30% Na$_2$EDTA and 44% CaO$_2$.

The effectiveness of the preferred granule is described in the following examples:

(EXAMPLE 1)

Using high agitation, a mixture of 6.0 g hydroxypropyl guar gum, 1.2 g sodium bicarbonate, and 20.0 g potassium chloride was added to 1 l of tap water. The stirring rate was reduced to provide mild agitation for 30 minutes. Afterward, 0.30 g 20/40 mesh pellets were added to the solution. The pellet composition was 6% sodium silicate, 20% iron(III) EDTA, 30% Na$_2$EDTA and 44% calcium peroxide, all percentages being weight percentages based on the total weight of the pellet. The solution was gelled with 2.5 ml. of an aqueous zirconium lactate solution (3.50% as ZrO$_2$).

The rate of viscosity decline was measured with a FANN 50 rotational viscometer, using couette geometry tools. A 42 ml. sample of gel was poured into the FANN 50 sample cup (FANN's R1 rotor cup). The bath was preheated to the test temperature, in this case 200° F. The sample was then heated to test temperature and pressured to 200 psi with nitrogen. While heating, the sample was sheared at 100 sec$^{-1}$ for 20 minutes and the torque measured as a deflection of the FANN's B1 bob. At temperature, a rate sweep using 170, 128, 85 and 42 sec$^{-1}$ was made and repeated every 60 minutes. The interim rate between sweeps was 100 sec$^{-1}$. The Power Law indices n' and K' and the viscosity at 170 sec$^{-1}$ were calculated from the log rate stress plots. Table 1 shows the minimal viscosity decline over time.

TABLE 1

| Time (hrs) | Temp °F. | n' | K' lb · sec/ft$^2$ | Viscosity cps 170s$^{-1}$ |
|---|---|---|---|---|
| 0.28 | 199 | 0.608 | 0.0472 | 302 |
| 1.0 | 199 | 0.709 | 0.0177 | 191 |
| 2.0 | 199 | 0.658 | 0.0177 | 147 |
| 3.0 | 199 | 0.701 | 0.0125 | 129 |
| 4.0 | 199 | 0.614 | 0.0169 | 112 |
| 5.0 | 200 | 0.683 | 0.0111 | 105 |

(EXAMPLE 2)

Example 1 was repeated except that the oxidant pellets were crushed to a fine powder before addition to the fluid. This will mimic the fluid response after crushing in the sand pack. The viscosity loss is shown in Table 2.

TABLE 2

| Time (hrs) | Temp °F. | n' | K' lb · sec/ft$^2$ | Viscosity cps 170s$^{-1}$ |
|---|---|---|---|---|
| 0.28 | 184 | 0.532 | 0.0063 | 27 |
| 0.78 | 183 | 0.604 | 0.0038 | 24 |

(EXAMPLE 3)

Into 1 l of rapidly stirring tap water was added 4.8 g high viscosity guar gum and 20.0 g potassium chloride. The stirring rate was reduced to provide gentle agitation for 30 minutes. Afterward, 5 ml. 45% (wt.) aq. potassium carbonate was added to bring the solution pH to 10.50 followed by the addition of 0.3 g of 20 to 40 mesh pellets described in Example 1. With vigorous stirring, 0.2 g boric acid was added to form a gel almost immediately. The viscosity decline was measured as described in Example 1. These data are shown in Table 3.

TABLE 3

| Time (hrs) | Temp °F. | n' | K' lb · sec/ft$^2$ | Viscosity cps 170s$^{-1}$ |
|---|---|---|---|---|
| 0.28 | 205 | 0.361 | 0.0995 | 179 |
| 1.0 | 202 | 0.660 | 0.0333 | 278 |
| 2.0 | 203 | 0.853 | 0.0113 | 256 |
| 3.0 | 203 | 1.055 | 0.0027 | 177 |
| 4.0 | 204 | 1.303 | 0.0002 | 46 |
| 5.0 | 208 | 0.889 | 0.0001 | 5 |

(EXAMPLE 4)

Example 3 was repeated except that the pellets were crushed before adding them to the fluid. This process will mimic the crushing of the pellets in the sand pack during fracture closure. These data are shown in Table 4.

TABLE 4

| Time (hrs) | Temp °F. | n' | K' lb · sec/ft$^2$ | Viscosity cps 170s$^{-1}$ |
|---|---|---|---|---|
| 0.28 | 209 | 0.945 | 0.0005 | 20 |
| 0.78 | 202 | 0.744 | 0.0005 | 7 |
| 1.0 | 202 | 0.258 | 0.0053 | 6 |

In a typical fracturing operation, the fracturing fluid of the invention is pumped at a rate sufficient to fracture the formation and to place propping agents into the fracture. A typical fracturing treatment would be conducted by hydrating a 0.24 to 0.72% galactomannan based polymer, such as a guar, in a 2% (weight/vol) KCl solution at a pH ranging from about 5.0 to 8.5. The pelletized breaker of the invention is generally metered into the base gel above ground as solid pellets. For applications using pellets smaller than about 80 U.S. mesh, the particles can be dispersed in an aqueous carrier fluid and flowed to the desired location in the subterranean formation. The fracturing fluid will generally contain from about 0.001 to about 2.0% and preferably from about 0.006 to about 0.24% by weight of the pelletized breaker based on the weight of the aqueous fluid employed. The method of the invention can also be employed to place a mixture of combination of breakers or the mixture or combination of a breaker with a second treating agent into the subterranean formation.

An invention has been provided with several advantages. The fracturing fluid of the invention cleans up quickly and allows enhanced sand pack permeability. The fracturing fluid and method of the invention also provide a method for producing a controlled reduction in the viscosity of the fracturing fluid with time so that the gelled fluid "breaks" at the conclusion of pumping operations, thereby facilitating the cleanup of the fluid from the formation. The method of the invention provides a controlled break while providing optimum initial gel stability and without the disadvantages attendant to prior art techniques including the direct addition of persulfate salts and the previously described encapsulation processes.

While the invention has been shown in only one of its forms, it is not thus limited but is susceptible to various changes and modifications without departing from the spirit thereof.

What is claimed is:

1. A method for fracturing a subterranean formation, comprising the steps of:

forming a gellable fracturing fluid by blending together an aqueous fluid, a hydratable polymer and a suitable crosslinking agent for crosslinking the hydratable polymer to form a polymer gel;

incorporating within the gellable fracturing fluid a breaker material which has been formed into a pellet, the pellet comprising a substantially insoluble oxidant and a binder for the oxidant, wherein said substantially insoluble oxidant is selected from the group consisting of alkaline earth and zinc salts of peroxide, perphosphate, perborate, and percarbonate.

2. The method of claim 1, wherein the oxidant used to form the pellet is provided in a preselected granule size, the granule size being in the range from about 200 to 6 U.S. mesh.

3. The method of claim 2, wherein the granule size of the oxidant is in the range of about 80 to 12 U.S. mesh.

4. The method of claim 1, wherein the pellet of substantially insoluble oxidant contains a chelating agent and an activator.

5. The method of claim 4, wherein the chelating agent is selected from the group consisting of salts of ethylenediaminetetraacetic acid, citric acid, aminocarboxylic acid and its salts, polyphosphonated and polyphosphated compounds, boric acid and its salts, and the alkali metal salts of carbonates.

6. The method of claim 4, wherein the activator is selected from the group consisting of iron and copper complexes of ethylenediaminetetraacetic acid.

7. The method of claim 1, wherein the binder for the substantially insoluble oxidant is an aqueous solution of sodium silicate.

8. The method of claim 4, wherein the pellet is comprised of about 40 to 99% oxidant, 1 to 20% binder, 0 to 75% chelating agent and 0 to 50% activators, all percentages being weight percentages based on the total weight of the pellet so formed.

9. The method of claim 8, wherein the pellet is comprised of about 6% sodium silicate, 20% iron (III) ethylenediaminetetraacetic acid, 30% sodium ethylenediaminetetraacetic acid and 44% calcium peroxide, all percentages being weight percentages based on the total weight of the pellet so formed.

10. A fracturing fluid comprising:

a carrier fluid, a viscosifying polymer, a crosslinking agent and a gel degrading amount of a pellet material comprising a substantially insoluble oxidant combined with a binder for the oxidant to form a pellet, wherein said substantially insoluble oxidant is selected from the group consisting of alkaline earth and zinc salts of peroxide, perphosphate, perborate, and percarbonate.

11. The fracturing fluid of claim 10, wherein the oxidant used to form the pellet is provided in a preselected granule size, the granule size being in the range from about 200 to 6 U.S. mesh.

12. The fracturing fluid of claim 11, wherein the granule size of the oxidant is in the range of about 80 to 12 U.S. mesh.

13. The fracturing fluid of claim 10, wherein the pellet also contains a chelating agent and an activator.

14. The fracturing fluid of claim 4, wherein the chelating agent is selected from the group consisting of salts of ethylenediaminetetraacetic acid, citric acid, aminocarboxylic acid and its salts, polyphosphonated and polyphosphated compounds, boric acids and its salts, and the alkali metal salts of carbonates.

15. The fracturing fluid of claim 13, wherein the activator is selected from the group consisting of iron and copper complexes of ethylenediaminetetraacetic acid.

16. The fracturing fluid of claim 10, wherein the binder for the substantially insoluble oxidant is an aqueous solution of sodium silicate.

17. The fracturing fluid of claim 13, wherein the pellet is comprised of about 40 to 99% oxidant, 1 to 20% binder, 0 to 75% chelating agent and 0 to 50% activators, all percentages being weight percentages based on the total weight of the pellet so formed.

18. The fracturing fluid of claim 17, wherein the pellet is comprised of about 6% sodium silicate, 20% iron (III) ethylenediaminetetraacetic acid, 30% sodium ethylenediaminetetraacetic acid and 44% calcium peroxide, all percentages being weight percentages based on the total weight of the pellet so formed.

* * * * *